Oct. 4, 1927.
A. G. REDMOND
1,643,957
CHARGE HEATING CONTROL FOR INTERNAL COMBUSTION ENGINES
Filed April 22, 1920    2 Sheets-Sheet 1
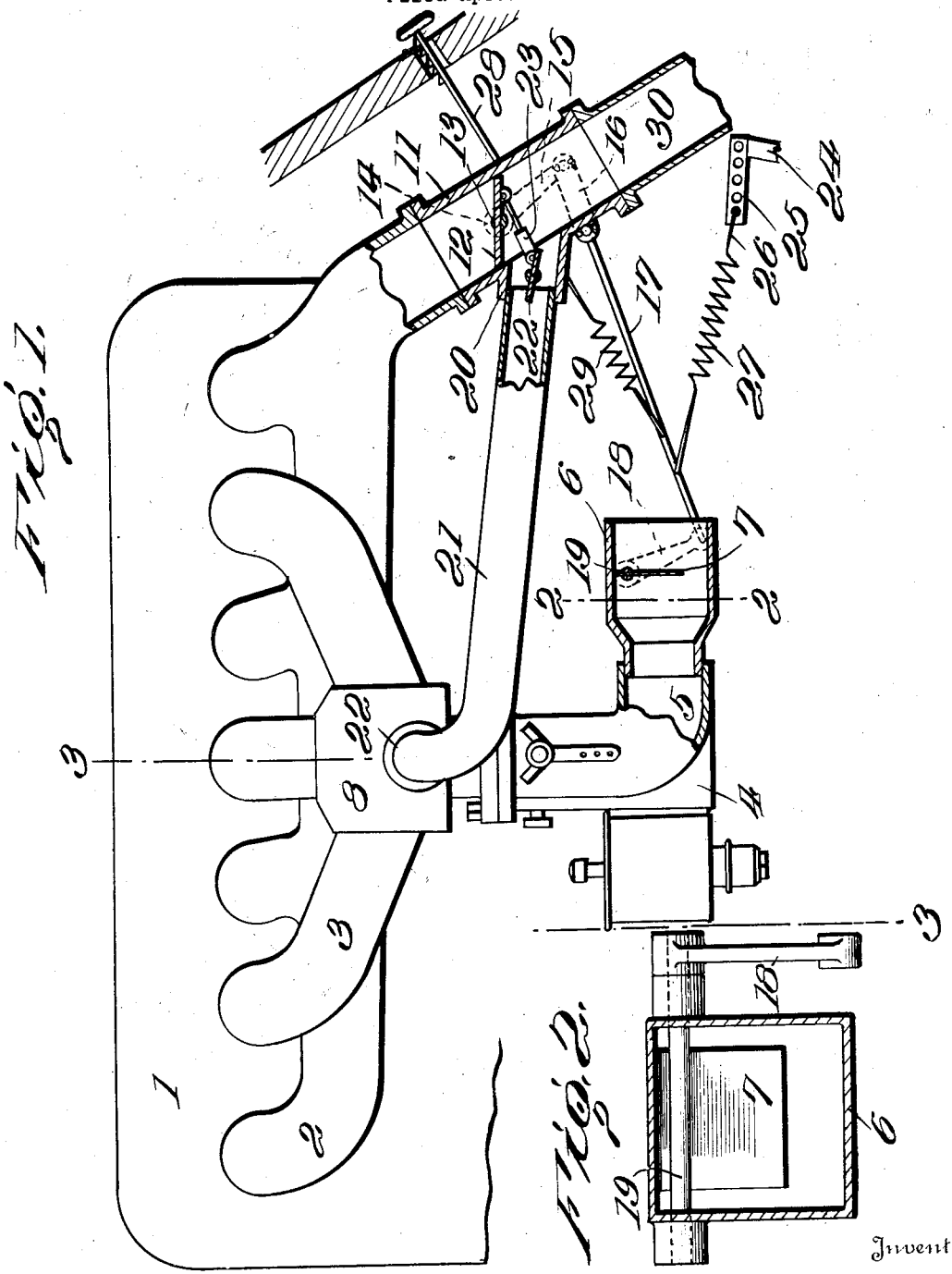
Inventor
A. G. Redmond
By _____ Attorney Oct. 4, 1927.  
A. G. REDMOND  
1,643,957  
CHARGE HEATING CONTROL FOR INTERNAL COMBUSTION ENGINES  
Filed April 22, 1920  2 Sheets-Sheet 2
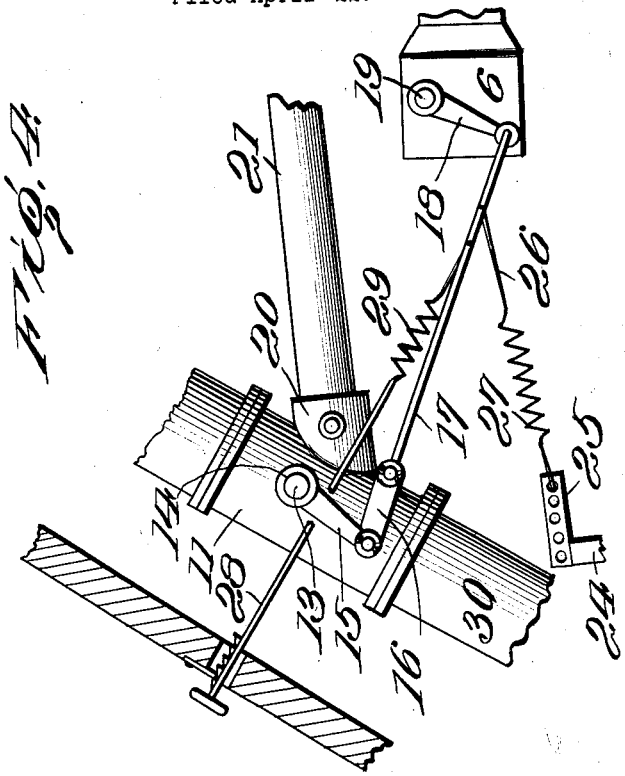
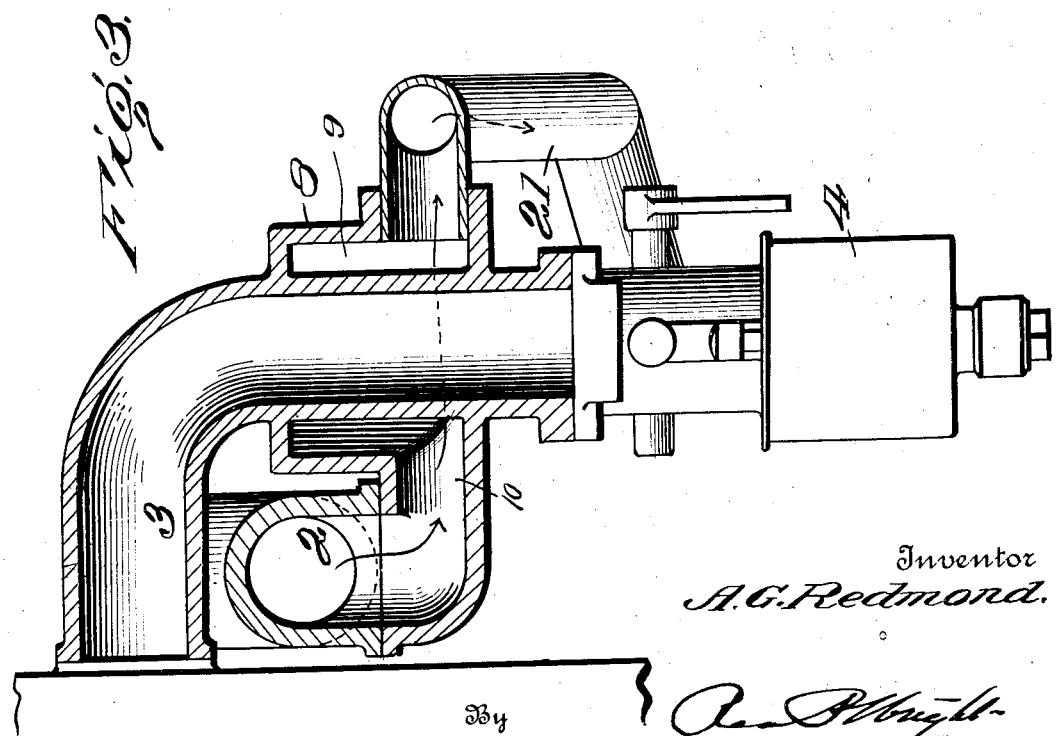
Inventor  
A. G. Redmond.  
By  
Attorney Patented Oct. 4, 1927.

1,643,957

UNITED STATES PATENT OFFICE.

ALBERT G. REDMOND, OF INDIANAPOLIS, INDIANA, ASSIGNOR TO MARVEL CARBURETER COMPANY, OF FLINT, MICHIGAN, A CORPORATION OF INDIANA.

CHARGE-HEATING CONTROL FOR INTERNAL-COMBUSTION ENGINES.

Application filed April 22, 1920. Serial No. 375,773.

This invention relates to a charge heating control for internal combustion engines and is a companion application of my application executed on even date herewith, the object being to provide means for operating the valves controlling the exhaust gases and the heating jacket by a movable member arranged in the air inlet of the charge forming device, said movable member being in the nature of a shutter disposed in such a position within the air inlet of the carbureter that the velocity caused by the suction of the engine according to the speed thereof will shift the valves so that the maximum amount of heat will be applied to the charge at low speed and the minimum amount of heat applied to the charge at high speed of the engine.

Another and further object of the invention is to provide a construction which can be readily applied to any of the well known forms of internal combustion engines and charge forming devices.

Other and further objects and advantages of the invention will be hereinafter set forth and the novel features thereof defined by the appended claims.

In the drawings,

Figure 1 is a side elevation of a portion of an internal combustion engine showing the application of my improved construction of charge heating control partly in section.

Figure 2 is a section taken on line 2—2 of Figure 1; and

Figure 3 is a section taken on line 3—3 of Figure 1.

Figure 4 is a detailed side view showing the arm and link connections of the exhaust throttle.

In the drawing 1 indicates an internal combustion engine having an exhaust manifold 2, an intake manifold 3 which has connected thereto a charge forming device 4 provided with an air inlet 5 to which is connected an auxiliary air pipe 6 provided with a shutter or valve 7 of such a size that the free area around the shutter equals the free area at the throttle of the charge forming device.

The intake manifold 3 is surrounded by a jacket 8 forming a heat chamber 9 which is provided with an inlet 10 connected to an outlet formed in the exhaust manifold 2 through which the exhaust gases are adapted to pass so as to heat the charge in its passage from the charge forming device through the intake manifold to the internal combustion engine.

The exhaust manifold 2 has a pipe section 11 connected thereto provided with a valve 12 mounted on a shaft 13 extending through the walls of the pipe section 11 and provided with a collar 14 having an arm 15 to which is connected a link 16 which in turn is connected to a rod 17 having its end pivotally connected to an arm 18 fixed on the shaft 19 of the shutter 7 disposed in the pipe section 6 as clearly shown.

The pipe section 11 is provided with a branch inlet 20 which is connected by pipe 21 to the outlet 22 of a heat jacket so that the exhaust gases which pass from the intake manifold into the heating chamber of the jacket can circulate around a portion of the intake manifold and be carried out through pipe 21 back into the section 11 of the exhaust pipe. The branch 20 is provided with a valve 22 for closing the same which is connected to the valve 12 by an adjustable link 23 whereby the relative positions of the two valves can be adjusted and as herein shown when the valve 12 is closed, valve 22 is opened.

Secured to a suitable support of the motor vehicle in which the internal combustion engine is inserted is a bracket 24 provided with a plurality of openings 25 adapted to receive the hooked end 26 of a coil spring 27 which is connected to the rod 17 as shown for applying tension to the shutter 7 and it will be seen that by adjusting the spring in the various openings the movement of the valve 7 can be regulated in the air inlet. As the velocity or force of the air passing through the pipe 6 increases as the speed of the motor increases, the valve is swung on a shaft which through the rod 17, link 16 and arm 15 opens so as to allow a portion of the exhaust gases to pass directly out through the exhaust manifold without circulating through the heat jacket. When at low speed, the force of air through the air inlet of the charge forming device is insufficient to move the valve 7 and the valves 12 and 22 are held in the position shown so as to cause the entire volume of gases to pass through the heating jacket.

In order to provide means for holding the valve 7 in the position against the force of air passing through the pipe section 6 when warming up the engine to which the device is attached, I provide a dash controlled rod 28 which is connected to the rod 17 through the medium of spring 29 so that by pulling the rod 28 the operator can hold the valves in the position shown. The pipe section 11 is connected to the ordinary exhaust line pipe 30 which extends to the muffler.

From the foregoing description it will be seen that I have provided a heat control for the charge forming device of an internal combustion engine which is automatical in operation, the position of the valve for controlling the heat to the charge being controlled through the medium of a swinging shutter arranged in the path of the air passing into the charge forming device. While I have shown certain details of construction, I do not wish to limit myself to these details as I am aware that various changes can be made without departing from the spirit of my invention.

What I claim is:—

1. An internal combustion engine having an exhaust pipe, intake manifold and charge forming device connected thereto, a heater arranged to heat the charge in its passage from the charge forming device to the engine and means actuated by the velocity of the air passing through said charge forming device for controlling the admission of heating fluid to said heater.

2. An internal combustion engine having an exhaust pipe, intake manifold and charge forming device connected thereto, a heater arranged to heat the charge delivered to the engine, said heater having an inlet and outlet pipe connected to the exhaust pipe, a valve mounted in the exhaust pipe and means for actuating said valve controlled by the velocity of air through said charge forming device.

3. An internal combustion engine having an exhaust pipe, intake manifold and charge forming device connected thereto, a heating chamber arranged to heat the charge in its passage to the engine having an inlet and outlet pipe connected to the exhaust pipe, a valve disposed in the exhaust pipe between the inlet and outlet of the connection with said heater and means for actuating said valve controlled by the force of air passing through said charge forming device.

4. An internal combustion engine having an exhaust pipe, intake manifold and charge forming device connected thereto, a heating chamber arranged to heat the charge in its passage to the engine having an inlet and outlet pipe connected to the exhaust pipe, a valve disposed in the exhaust pipe between the inlet and outlet of the connection with said heater, a valve in the outlet pipe of said heater having a connection with the first mentioned valve and means for actuating the first mentioned valve controlled by the velocity of air entering said charge forming device.

5. An internal combustion engine having an exhaust pipe, intake manifold and charge forming device connected thereto, said charge forming device having an air inlet provided with a movable member, a heater for heating the charge in its passage from said charge forming device to said engine, said heater having inlet and outlet pipes connected to the exhaust pipe, a valve for controlling the passage of exhaust gases to said heater, means for retarding the movement of said movable member in said air inlet and a connection between said valve and said movable member for controlling the admission of exhaust gases to said heater by the velocity of air passing through said air inlet.

6. An internal combustion engine having an exhaust pipe, intake manifold and charge forming device connected thereto, a heater arranged to heat the charge delivered to the engine, said heater having an inlet and outlet connected to the exhaust pipe, a valve mounted in the exhaust pipe intermediate its connection with said heater, an air pipe disposed in the air inlet of said charge forming device having a movably mounted shutter, adjustable means for exerting resistance to the movement of said shutter and a connection between said valve and said shutter for controlling the admission of exhaust gases to said heating chamber.

7. A charge heating device for an internal combustion engine comprising a heater adapted to be arranged around the induction pipe of an internal combustion engine, a valve for controlling the passage of exhaust gases to said heater and means for actuating said valve by the velocity of air passing into said charge forming device.

8. A charge forming device for an internal combustion engine comprising a heater arranged to heat the charge in its passage from the charge forming device to the engine, a valve for controlling the passage of exhaust gases to said heater, means for actuating said valve by the velocity of air entering the charge forming device and means for manually operating said valve.

9. An internal combustion engine having an exhaust pipe, intake manifold and carbureter connected thereto, a heating chamber surrounding said intake manifold having an inlet and outlet, the inlet being in communication with said exhaust manifold, a valve mounted in said exhaust pipe, a pipe extending from the outlet of said heater to said exhaust pipe on the outlet side of said valve, a second valve arranged in the branch formed in said exhaust pipe, an adjustable connection between said valves, a pivoted shutter arranged in the air inlet of said charge forming device, means for exerting resistance to the swinging movement of said shutter and a connection between said shutter and the first mentioned valve for controlling the passage of said exhaust gases through said heater.

10. An internal combustion engine having an exhaust pipe, intake manifold and carbureter connected thereto, a heater arranged to heat the charge delivered to the engine, said heater having an inlet and outlet, the inlet being connected to the exhaust at a point adjacent the engine and the outlet to the exhaust at a point remote from the engine, a valve arranged within the exhaust, a second valve arranged to control the passage of exhaust gases through said heater, an adjustable connection between said valves, an air pipe arranged within the air inlet of said carbureter, a pivoted shutter arranged within said air inlet, a connection between said pivoted shutter and the first mentioned valve for actuating said valve by the velocity of air passing through said air inlet.

11. An internal combustion engine having an exhaust pipe, intake manifold and charge forming device connected thereto, a heater arranged to heat the charge delivered to the engine in communication with the exhaust pipe, a valve for controlling the passage of exhaust gases from said exhaust pipe to said heater, a movable shutter arranged in the air inlet to said charge forming device and a connection between said shutter and said valve for controlling the admission of exhaust gases to said heater by the velocity of air passing into said charge forming device.

12. A charge heating device for internal combustion engines comprising a heater arranged to heat the charge in its passage from the charge forming device to the engine, means for controlling the passage of exhaust gases to said heater and means for actuating said means by the changing vacuum existing in the air inlet of the charge forming device controlling the passage of exhaust gases to said heater.

13. An internal combustion engine having an exhaust manifold, intake manifold and charge forming device therefor, a heater arranged to heat the charge in its passage from the charge forming device to the engine, a valve arranged within the exhaust pipe controlling the passage of exhaust gases to said heater and means for actuating said valve by the changing vacuum existing in the air inlet of said charge forming device controlling the passage of exhaust gases to said heater.

14. An internal combustion engine having an exhaust pipe, intake manifold and charge forming device connected thereto, a heater arranged to heat the charge in its passage from the charge forming device to the engine, a valve disposed in the exhaust pipe, and means disposed in the air inlet of said charge forming device having a connection with said valve for controlling the position of said valve by the velocity of air entering said air inlet.

15. An internal combustion engine having an exhaust pipe, intake manifold and charge forming device connected thereto, a heater arranged to heat the charge in its passage to the internal combustion engine in communication with said exhaust pipe, a valve disposed in said exhaust pipe and means actuated by the velocity of air passing through said charge forming device having a connection with said valve controlling the passage of exhaust gases to said heater.

16. An internal combustion engine having an exhaust pipe, intake manifold and charge forming device connected thereto having a single air inlet, a heater arranged to heat the charge in its passage to the internal combustion engine in communication with said exhaust pipe and means actuated by the velocity of air passing through said air inlet of said charge forming device for controlling the passage of exhaust gases to said heater.

17. The combination with an internal combustion engine, of a charge forming device therefor having a main air inlet, a heater for heating the explosive charge produced by said charge forming device, means for conveying heating medium from said engine to said heater and means actuated by the velocity of air passing through the main air inlet of said charge forming device for controlling the passage of heating medium to said heater.

18. The combination with an internal combustion engine having a charge forming device connected thereto provided with an air inlet below the fuel feeding means therefor, of a heater for heating the explosive charge produced by said charge forming device, means for conveying heating medium from said engine to said heater and means arranged within said charge forming device below the fuel feeding means actuated by the velocity of air passing through said charge forming device for controlling the passage of heating medium to said heater.

In testimony whereof I have hereunto affixed my signature.

ALBERT G. REDMOND.